Dec. 9, 1958 R. M. VAUGHN 2,863,351
EXPANDING FASTENER HAVING THREADS OF OPPOSITE
HAND TO MAINTAIN THE PARTS IN ENGAGEMENT
Filed Feb. 20, 1956

INVENTOR.
RUDOLPH M. VAUGHN
BY Elliott & Pastoriza
ATTORNEYS

United States Patent Office 2,863,351
Patented Dec. 9, 1958

2,863,351

EXPANDING FASTENER HAVING THREADS OF OPPOSITE HAND TO MAINTAIN THE PARTS IN ENGAGEMENT

Rudolph M. Vaughn, Santa Ana, Calif.

Application February 20, 1956, Serial No. 566,442

5 Claims. (Cl. 85—2.4)

This invention relates to fastening devices and more particularly to a high shear strength fastener for securing together overlapping plates and the like wherein access may be had to only one side of the plates.

An important object of this invention is to provide a blind fastener which is capable of withstanding much higher shear tensions than has characterized similar fastening devices heretofore.

Another important object is to provide a fastener which is effective in securing together members of different overall thicknesses whereby a standardized blind fastener capable of accommodating several different thicknesses may be manufactured.

Still another object of this invention is to provide a blind fastener to which very high driving torques may be applied to insure an extremely secure gripping action, and yet which may be removed if it is desired to disassemble the particular structure to which the fastening device is applied.

These and other objects and advantages of this invention are attained by providing three basic elements cooperating together in a manner to enable a blind fastening to be achieved. These elements consist of a screw, a sleeve member, and an expandable nut. The sleeve member serves as a guide for the screw surrounding the shank of the screw between the screw head and the expandable nut.

The portions of the sleeve and nut are provided with inter-engaging means preferably in the form of secondary left hand screw threads whereby the nut and sleeve may be secured together in axial alignment and the nut held by the sleeve against rotation in the direction of normal rotation of the screw. The screw is threadedly received in the upper end portion of the nut by conventional right hand screw threads. The screw and sleeve are made of hardened metal to provide an extremely high strength in shear while the expandable nut is made of a malleable metal and is softer than either the sleeve or screw.

With the nut threaded by means of the left hand threads to the sleeve and the screw inserted in the sleeve and threaded partially into the nut, the entire assembly is inserted through registered openings in plates or other members to be secured together. The thickness of the overall opening is normally less than the length of the sleeve so that one end of the sleeve and the nut protrude out the opposite side of the opening. The other end of the sleeve has an annular flange seating the head of the screw and engaging the edge of the opening. The sleeve is held against rotation and the screw then tightened in the nut by a suitable driving tool. Further threading of the screw into the nut will tend to rotate the nut in a counter clockwise direction as viewed from the opposite side of the opening thereby tightening the nut onto the sleeve as a result of the left hand threads. Since the expandable nut material is more malleable than the sleeve and screw, continued driving of the screw into the nut forces the lower portion of the nut over the protruding end of the sleeve, expanding and deforming the same until it comes into tight engagement with the opposite side of the members to be fastened together. The extent of threading of the screw into the nut in order to insure secure gripping of the members to be fastened, will depend upon the overall thickness of these members. The arrangement and design of the expandable nut are such that a considerable variation in opening thickness may be accommodated.

A better understanding of the invention and of its various features and advantages will be had by referring to the accompanying drawings illustrating a preferred embodiment thereof, and in which.

Figure 1:
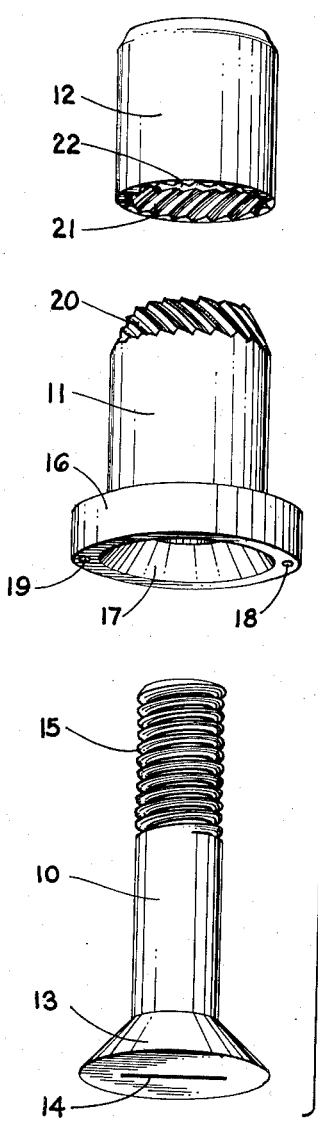
Figure 1 is an exploded perspective view illustrating the basic elements of the blind fastener.

Referring to Figure 1, the basic elements of the fastening device are illustrated as comprising a screw 10, cylindrical sleeve 11, and expandable nut 12. The screw 10 has a flat head 13 preferably provided with a high torque drive slot 14 such as shown and described in my U. S. Patent Number 2,677,985 issued May 11, 1954 and titled, "Slotted Screw Head." The other end of the screw 10 is threaded as at 15 with a conventional right hand screw thread.

The sleeve 11 includes a head portion in the form of an annular flange 16 having an inner conical seating surface 17 for receiving the head 13 of the screw 10. Flange 16 is of a greater transverse dimension than the sleeve 11 whereby it will engage the peripheral edge portions of one side of an opening through which the sleeve is passed. A pair of small bores 18 and 19, the purpose for which will become clearer as the description proceeds are provided in the flange 16 as shown. The upper end of the sleeve 11 has tapered left hand secondary threads 20. Both the screw 10 and sleeve 11 are made of high heat treated hardened alloys capable of withstanding very high shear forces in planes perpendicular to their longitudinal axes.

The expandable nut 12 may include at its lower interior end secondary left hand screw threads 21 adapted to mate with the secondary threads 20 on the sleeve 11. A recessed portion 22 is also provided within the expandable nut 12 the purpose for which will become clearer as the description proceeds.

Figure 2:
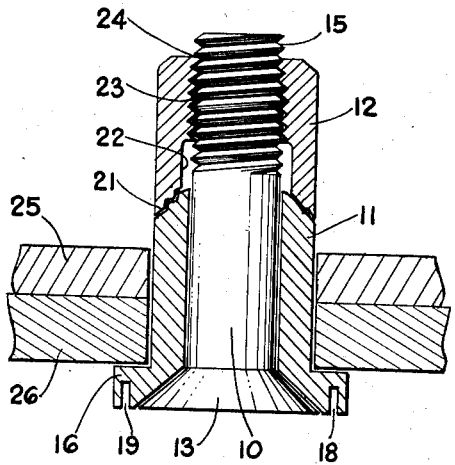
Figure 2 is an elevational view partly in cross section illustrating the fastener in position just prior to securing two members together; and, Figure 3 is a view similar to Figure 2 illustrating the relative positions of the elements after the fastening device has been tightened to grip the overlapping members.

Referring now to Figure 2, the fastening device is illustrated in assembled position wherein the recess 22 within the expandable nut 12 is shown as extending up to a point substantially midway of the length of the nut, the remaining interior portion of the nut comprising a conventional right hand threaded portion 23 adapted to mate with the threads 15 of the screw 10. Preferably, the upper portion of the expandable nut 12 is crimped slightly to deform the upper end of the threaded portion of threads 23 as at 24, thereby insuring a tight frictional engagement of the nut with the screw 10.

As shown in Figure 2, the assembly is positioned through registered openings in a pair of overlapping members 25 and 26 preparatory to fastening these two members together. It will be noted that the screw 10, sleeve 11, and nut 12 in the assembled position shown in Figure 2, may simply be inserted through the registered openings in the members 25 and 26 from one side of the work. To enable this blind insertion, the outside transverse dimension of the nut should be made equal to or less than the outside transverse dimension of the sleeve.

Figure 3:
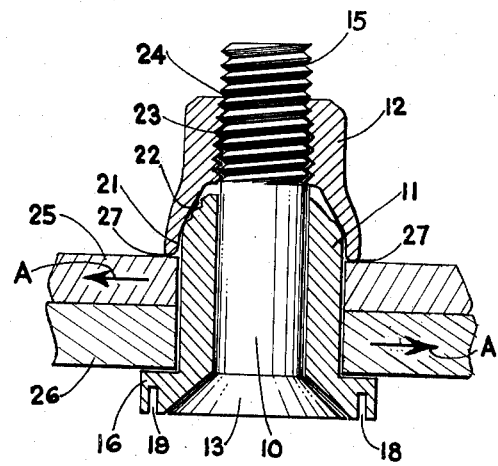

Figure 3 illustrates the relative positions of the fastening device elements after the screw 10 has been threaded into the nut 12. In effecting this threading operation, a tool is employed for holding the sleeve 11 against rotation while the screw 10 is threaded into the nut. The small bores 18 and 19 in the flange 16 of the sleeve 11 constitute holding means for this purpose, the tool having dowel projections insertable in these openings. Other means for holding the sleeve may, of course, be provided.

With the sleeve 11 securely held, a driving torque is applied to the screw 10 to thread the same into the nut 12. This action will tend to rotate the nut 12 in a counter clockwise direction as viewed from the opposite side of the opening. Since the secondary threads 20 and 21 on the sleeve and lower portion of the nut respectively are left handed, this counter clockwise rotation will serve to tighten the nut 12 on the sleeve 11. Continued threading of the screw 10 into the nut 12 pulls the nut 12 axially towards the sleeve causing the lower peripheral portions of the nut to expand over the end of the sleeve 11. The recessed portion 22 within the nut will receive the sleeve end as the nut is moved. Provision of this recess also renders the walls of the lower portion of the nut thinner whereby their radial expansion over the sleeve is facilitated.

It should be noted that in view of the left hand secondary threads 20 and 21, the tendency for the nut to turn in a counter clockwise direction will be such as to screw the nut 12 over the sleeve 11 in the desired direction. There will thus be a force component tending to move the sleeve against the material 25 exerted by the secondary threads 20 and 21 as well as by the action of the threads 15 of the screw with the threads 23 on the main portion of the nut. The secondary threads 20 and 21 are preferably of a relatively steep pitch as illustrated. Since the nut 12 is made of a malleable material, softer than the material comprising the screw 10 and sleeve 11, the spreading action of the nut as described will take place. The members 25 and 26 are thus securely gripped between the sleeve flange 16 on one side and the radially expanded circumferential end portion of the nut on the other side.

The extent to which the screw 10 is threaded into the nut 12 will depend upon the overall thickness of the members 25 and 26, that is, the thickness of the opening through which the fastening extends. For relatively thick openings the degree of threading of the screw 10 into the nut 12 need only be sufficient to bring the edge of the lower portion of the nut into tight engagement with the upper surface of the member 25. In this instance, relatively little axial movement of the nut 12 over the sleeve 11 takes place. On the other hand, if the members 25 and 26 are relatively thin, the screw 10 is threaded further into the nut 12 to pull the nut over the sleeve 11 a greater axial distance until the lower peripheral edge of the nut is brought into tight engagement with the opposite peripheral edge of the opening. By use of the high torque slotted screw head as described in the above mentioned issued patent, a very high torque may be applied to the screw 10 to insure sufficient threading of the screw into the nut.

It should be noted that only the hardened sleeve and screw shank portions of the fastener are subject to high shear forces, as indicated by the arrows A—A in Figure 3, whereas the softer expandable nut 12 will not be subject to these forces.

A further feature of the blind fastener of this invention resides in the fact that it may be removed should it be desired to disassemble the members 25 and 26. This removal is accomplished by simply unscrewing the screw 10 thereby backing off the nut 12 and at the same time tending to rotate the nut 12 in a clockwise direction as viewed from the rear. Because of the left hand secondary threads 20 and 21 between the lower portion of the nut 12 and the sleeve 11, even though warped to a considerable extent by the deformation of the nut in expanding, this clockwise rotation will also co-operate in backing the nut 12 away from the sleeve 11. The unscrewing of the screw 10 is continued until the expandable nut simply drops off the end of the screw. The screw 10 and sleeve 11 may then be removed from the opening.

The present invention, accordingly, provides an extremely high shear strength fastening device which may be secured from one side of an opening and may accommodate different thicknesses of materials to be fastened together. Modifications within the scope and spirit of this invention will occur to those skilled in the art. The blind fastener is therefore not to be thought of as limited to the specific embodiment chosen for illustrative purposes.

What is claimed is:

1. A blind fastener adapted to be passed through registered openings in members to enable securement of the members together from one side thereof, comprising: a threaded screw having a head; a sleeve adapted to receive said screw and said head, the end of said screw extending beyond the end of said sleeve; an expandable nut having threads in threaded engagement with the end of said screw such that turning of said screw in one direction moves said nut axially towards said end of said sleeve, said nut being of a material softer than the material of said sleeve; and external secondary threads on said end of said sleeve for engagement with the internal adjacent end portion of said nut, said secondary threads having a pitch greater than zero and opposite to the pitch of said threads on said nut so that said secondary threads are inclined with respect to the axis of said nut and exert a component of force on said nut to drive said nut axially over said end of said sleeve when said screw is turned in said one direction, said nut including a recessed portion extending interiorly from said adjacent end of greater inside diameter than the outside diameter of said screw, said recessed portion receiving said end of said sleeve whereby said nut will radially expand over said end of said sleeve upon continued turning of said screw.

2. A blind fastener according to claim 1, in which the entire circumference of said adjacent end of said nut is brought into engagement with one of said members.

3. A blind fastener according to claim 2, in which said sleeve includes means for holding it against rotation when said screw is turned.

4. A blind fastener comprising: a screw having a head at one end; a nut having a threaded portion receivable on the other end of said screw; a cylindrically shaped sleeve surrounding the shank portion of said screw between said head and said nut, said sleeve having an outside diameter no greater than the transverse outside dimension of said nut whereby both said sleeve and nut may be passed through an opening in members to be secured together; flange means on said sleeve seating the head of said screw and dimensioned to engage the periphery of one side of said opening, said flange means including means for holding said sleeve against rotation upon turning of said screw; said threaded portion of said nut having a thread direction such that turning of said screw drives said nut axially towards the adjacent end of said sleeve; external secondary threads on said adjacent end portion of said sleeve; said nut having an interior recessed portion providing wall portions of reduced thickness dimension relative to the threaded portion of said nut, said recessed portion receiving said secondary threads upon axial movement of said nut towards said sleeve, said secondary threads having a threading direction opposite to said threaded portion of said nut whereby said secondary threads co-operate to drive said nut over said adjacent sleeve end and said wall portions radially extend thereover so that the entire circumferential end of said recessed portion is moved into engagement with the periphery of the opposite side of said opening.

5. A blind fastener according to claim 4 in which the end threads of said threaded portion of said nut are deformed to frictionally grip the threads of said screw.

References Cited in the file of this patent
UNITED STATES PATENTS

| | | |
|---|---|---|
| 332,540 | Law | Dec. 15, 1885 |
| 2,282,711 | Eklund | May 12, 1942 |
| 2,381,113 | Cook | Aug. 7, 1945 |
| 2,516,554 | Coyne | July 25, 1950 |